United States Patent
Sagetong et al.

(10) Patent No.: US 8,548,056 B2
(45) Date of Patent: Oct. 1, 2013

(54) EXTENDED INTER-LAYER CODING FOR SPATIAL SCABILITY

(75) Inventors: Phoom Sagetong, Orange, CA (US); Hyukjune Chung, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1385 days.

(21) Appl. No.: 11/958,692

(22) Filed: Dec. 18, 2007

(65) Prior Publication Data

US 2008/0165850 A1 Jul. 10, 2008

Related U.S. Application Data

(60) Provisional application No. 60/883,881, filed on Jan. 8, 2007.

(51) Int. Cl.
*H04N 11/02* (2006.01)

(52) U.S. Cl.
USPC .................................................. 375/240.15

(58) Field of Classification Search
USPC .................................................. 375/240.15
See application file for complete search history.

(56) References Cited

U.S. PATENT DOCUMENTS

| | | | |
|---|---|---|---|
| 6,978,048 B1 * | 12/2005 | Higginbottom et al. ...... | 382/240 |
| 2002/0118742 A1 | 8/2002 | Puri et al. | |
| 2004/0086043 A1 * | 5/2004 | Ito et al. ................... | 375/240.11 |
| 2005/0053152 A1 * | 3/2005 | Raveendran et al. .... | 375/240.21 |
| 2006/0012719 A1 | 1/2006 | Karczewicz et al. | |
| 2006/0153295 A1 | 7/2006 | Wang et al. | |
| 2006/0233246 A1 | 10/2006 | Park et al. | |
| 2006/0262985 A1 * | 11/2006 | Chen et al. ..................... | 382/240 |
| 2008/0056356 A1 * | 3/2008 | Wang et al. .............. | 375/240.12 |
| 2008/0089597 A1 * | 4/2008 | Guo et al. ..................... | 382/238 |

(Continued)

FOREIGN PATENT DOCUMENTS

| | | |
|---|---|---|
| EP | 1694074 A1 | 8/2006 |
| EP | 1720358 | 11/2006 |

(Continued)

OTHER PUBLICATIONS

Heiko Schwarz et. Al., Joint Scalable Video Model JSVM-5, Joint Video Team (JVT) of ISO/IEC & ITU-T VCEG, JVT-R202, 18 Meeting: Bangkok, Thailand, Jan. 14-20, 2006.

(Continued)

*Primary Examiner* — Mark Rinehart
*Assistant Examiner* — Christopher R Crompton
(74) *Attorney, Agent, or Firm* — Elaine H. Lo (57) ABSTRACT

This disclosure describes techniques for coding information in a scalable video coding (SVC) scheme that supports spatial scalability. In one example, a method of coding information in a SVC scheme comprises coding first video blocks defined in a base layer of the SVC scheme, and coding second video blocks defined in an enhancement layer of the SVC scheme, wherein the second video blocks provide spatial scalability enhancement relative to the first video blocks. The coding of the second video blocks includes performing inter-layer prediction for the enhancement layer relative to the base layer for a first subset of the second video blocks that fully overlap the first video blocks, and performing inter-layer prediction for the enhancement layer relative to the base layer for a second subset of the second video blocks that partially overlap the first video blocks.

24 Claims, 5 Drawing Sheets

(56) References Cited

U.S. PATENT DOCUMENTS

| | | | |
|---|---|---|---|
| 2008/0095238 A1* | 4/2008 | Wu et al. | 375/240.16 |
| 2008/0187045 A1* | 8/2008 | Marquant et al. | 375/240.16 |
| 2008/0267291 A1* | 10/2008 | Vieron et al. | 375/240.16 |
| 2008/0291997 A1* | 11/2008 | Yoon et al. | 375/240.12 |
| 2010/0316124 A1* | 12/2010 | Park et al. | 375/240.13 |
| 2011/0110432 A1* | 5/2011 | Han et al. | 375/240.16 |

FOREIGN PATENT DOCUMENTS

| | | | |
|---|---|---|---|
| JP | 2006295600 A | | 10/2006 |
| WO | PCT/FR05/50839 | * | 4/2006 |
| WO | WO2006087314 A1 | | 8/2006 |
| WO | WO2006101681 A2 | | 9/2006 |
| WO | WO2006101682 A2 | | 9/2006 |

OTHER PUBLICATIONS

International Search Report—PCT/US2008/050452, International Search Authority—European Patent Office—Jun. 24, 2008.
Written Opinion—PCT/US2008/050452, International Search Authority—European Patent Office—Jun. 24, 2008.
TIA-1099 Standard: "Forward Link Only Air Interface Specification for Terrestrial Mobile Multimedia Multicast" Mar. 2007.
MacNicol, James, "Scalable Video Coding by Stream Morphing," IEEE Transactions on Circuits and Systems for Video Technology, vol. 15, No. 2, Feb. 2005, pp. 306-319.
Francois E., et al., "Modified inter-layer prediction for ESS", Joint Video Team (JVT) of ISO/IEC MPEG & ITU-T VCEG (ISO/IEC JTC1/SC29/WG11 and ITU-T SG16 Q.6) 21st Meeting: Hangzhou, China, Oct. 20-27, 2006, [JVT-U025].

* cited by examiner

EXTENDED INTER-LAYER CODING FOR SPATIAL SCABILITY

This application claims the benefit of U.S. Provisional Application No. 60/883,881, filed Jan. 8, 2007, the entire content of which is incorporated herein by reference.

TECHNICAL FIELD

This disclosure relates to digital video coding and, more particularly, scalable video coding (SVC) techniques that provide spatial scalability.

BACKGROUND

Digital video capabilities can be incorporated into a wide range of devices, including digital televisions, digital direct broadcast systems, wireless communication devices, wireless broadcast systems, personal digital assistants (PDAs), laptop or desktop computers, digital cameras, digital recording devices, video gaming devices, video game consoles, cellular or satellite radio telephones, and the like. Digital video devices implement video compression techniques, such as MPEG-2, MPEG-4, or H.264/MPEG-4, Part 10, Advanced Video Coding (AVC), to transmit and receive digital video more efficiently. Video compression techniques perform spatial and temporal prediction to reduce or remove redundancy inherent in video sequences.

In video coding, video compression often includes spatial prediction, motion estimation and motion compensation. Intra-coding relies on spatial prediction to reduce spatial redundancy between video blocks within a given video frame. Inter-coding relies on temporal prediction to reduce temporal redundancy between video blocks of successive video frames of a video sequence. For inter-coding, a video encoder performs motion estimation to track the movement of matching video blocks between two or more adjacent frames. Motion estimation generates motion vectors, which indicate the displacement of video blocks relative to corresponding prediction video blocks in one or more reference frames. Motion compensation uses the motion vectors to identify prediction video blocks from a reference frame. After motion compensation, a residual video block is formed by subtracting the prediction video block from the original video block to be coded. The video encoder usually applies transform, quantization and transform coefficient coding processes to further reduce the bit rate associated with communication of the residual block.

Some video coding makes use of scalable techniques. For example, scalable video coding (SVC) refers to video coding in which a base layer and one or more scalable enhancement layers are used. For SVC, a base layer typically carries video data with a base level of quality. One or more enhancement layers carry additional video data to support higher spatial, temporal and/or SNR levels. The base layer may be transmitted in a manner that is more reliable than the transmission of enhancement layers. SVC techniques may be used in a number of video coding environments, and may be particularly useful in wireless broadcast settings, e.g., television-like broadcasts to wireless handsets.

Spatial scalability is one type of SVC scheme in which enhancement layers add spatial resolution to frames of the base layer. In this case, a base layer may define a number of base layer video blocks of coded data, and the enhancement layer may define number of enhancement layer video blocks. The number of enhancement layer video blocks may be greater than the number base layer video blocks, thereby adding spatial resolution to frames of a video sequence. In SVC settings that support spatial scalability, inter-layer prediction may be used to reduce the amount of data needed to convey the enhancement layer. In inter-layer prediction, video blocks of the enhancement layer that fully overlap with video blocks of the base layer may be coded via predictive techniques that are similar to motion estimation and motion compensation. In particular, in inter-layer prediction, the enhancement layer information may be coded based on predictive video blocks of the base layer. In this way, inter-layer redundancy is exploited to yield data compression.

SUMMARY

In general, this disclosure describes techniques for coding information in a scalable video coding (SVC) scheme that supports spatial scalability. In SVC, video blocks are coded for a base layer and one or more enhancement layers. The coding of an enhancement layer includes inter-layer prediction in which at least some of the video blocks of the enhancement layer are coded based on predictive video blocks identified in the base layer.

The number of enhancement layer video blocks may be greater than the number of base layer video blocks such that the enhancement layer adds spatial resolution to frames of a video sequence relative to the base layer. Many of the video blocks of the enhancement layer may fully spatially overlap with video blocks of the base layer, in which case inter-layer prediction can be used. Some of the video blocks of the enhancement layer may not spatially overlap at all with the video blocks of the base layer, in which case inter-layer prediction may be avoided in favor of temporal or spatial prediction. This disclosure provides techniques that support inter-layer prediction for video blocks of the enhancement layer that only partially spatially overlap with video blocks of the base layer. The techniques may improve data compression, video quality, or both.

In one example, this disclosure provides a method of coding information in a scalable video coding (SVC) scheme comprising coding first video blocks defined in a base layer of the SVC scheme, and coding second video blocks defined in an enhancement layer of the SVC scheme, wherein the second video blocks provide spatial scalability enhancement relative to the first video blocks. The coding of the second video blocks includes performing inter-layer prediction for the enhancement layer relative to the base layer for a first subset of the second video blocks that fully overlap the first video blocks, and performing inter-layer prediction for the enhancement layer relative to the base layer for a second subset of the second video blocks that partially overlap the first video blocks.

In another example, this disclosure provides an apparatus that codes information according to a scalable video coding (SVC) scheme. The apparatus comprises a coding unit that codes first video blocks defined in a base layer of the SVC scheme and codes second video blocks defined in an enhancement layer of the SVC scheme, wherein the second video blocks provide spatial scalability enhancement relative to the first video blocks. Furthermore, with respect to the second video blocks the coding unit performs inter-layer prediction for the enhancement layer relative to the base layer for a first subset of the second video blocks that fully overlap the first video blocks, and performs inter-layer prediction for the enhancement layer relative to the base layer for a second subset of the second video blocks that partially overlap the first video blocks.

In another example, this disclosure provides a device that codes information in a scalable video coding (SVC) scheme, the device comprising means for coding first video blocks defined in a base layer of the SVC scheme, and means for coding second video blocks defined in an enhancement layer of the SVC scheme, wherein the second video blocks provide spatial scalability enhancement relative to the first video blocks. The means for coding the second video blocks includes means for performing inter-layer prediction for the enhancement layer relative to the base layer for a first subset of the second video blocks that fully overlap the first video blocks, and means for performing inter-layer prediction for the enhancement layer relative to the base layer for a second subset of the second video blocks that partially overlap the first video blocks.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable medium comprising instructions that upon execution in a video coding device cause the device to code information in a scalable video coding (SVC) scheme, wherein the instructions cause the device to code first video blocks defined in a base layer of the SVC scheme, and code second video blocks defined in an enhancement layer of the SVC scheme, wherein the second video blocks provide spatial scalability enhancement relative to the first video blocks. In this case, with respect to the second video blocks, the instructions cause the device to perform inter-layer prediction for the enhancement layer relative to the base layer for a first subset of the second video blocks that fully overlap the first video blocks, and perform inter-layer prediction for the enhancement layer relative to the base layer for a second subset of the second video blocks that partially overlap the first video blocks.

In some cases, the computer-readable medium may form part of a computer program product, which may be sold to manufacturers and/or used in a video coding device. The computer program product may include the computer-readable medium, and in some cases, may also include packaging materials.

In an added example, this disclosure provides a method for SVC comprising identifying enhancement layer video blocks that partially spatially overlap with base layer video blocks, and inter-coding at least a portion of some or all of the identified enhancement layer video blocks relative to the base layer video blocks. This method may also be implemented in hardware, software, firmware, or generally any implementation discussed below.

In other examples, this disclosure may be directed to a circuit, such as an integrated circuit, chipset, application specific integrated circuit (ASIC), field programmable gate array (FPGA), logic, or various combinations thereof configured to perform one or more of the techniques described herein.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

This disclosure describes techniques for coding information in a scalable video coding (SVC) scheme that supports spatial scalability. The SVC scheme may include a base layer and one or more enhancement layers. Inter-layer prediction may be used in coding various video blocks of the enhancement layer based on similar video blocks of the base layer. Inter-layer prediction for a video block of an enhancement layer may involve identifying a predictive video block of the base layer and coding residual information that represents the differences between the video block of the enhancement layer that is being coded and the predictive video block of the base layer. Alternatively, inter-layer prediction could entail identifying a predictive video block of the base layer and coding the corresponding video block of the base layer by assigning or inheriting texture and motion data from the predictive video block to the video block being coded.

Many of the video blocks of the enhancement layer may fully spatially overlap with video blocks of the base layer, in which case inter-layer prediction can be used very effectively. Some of the video blocks of the enhancement layer, however, may not spatially overlap with the video blocks of the base layer, in which case inter-layer prediction may be avoided for these video blocks in favor of temporal or spatial prediction for these video blocks. Some video blocks of the enhancement layer may partially spatially overlap with the video blocks of the base layer. This disclosure provides techniques that support inter-layer prediction for those video blocks of the enhancement layer that only partially spatially overlap with video blocks of the base layer. In this case, the coding unit may perform inter-layer prediction to code an overlapping portion of the partially spatially overlapping video blocks of the enhancement layer, and may perform supplemental coding techniques such as padding, interpolation or mirroring, to code a non-overlapping portion of the partially spatially overlapping video blocks of the enhancement layer.

Figure 1:
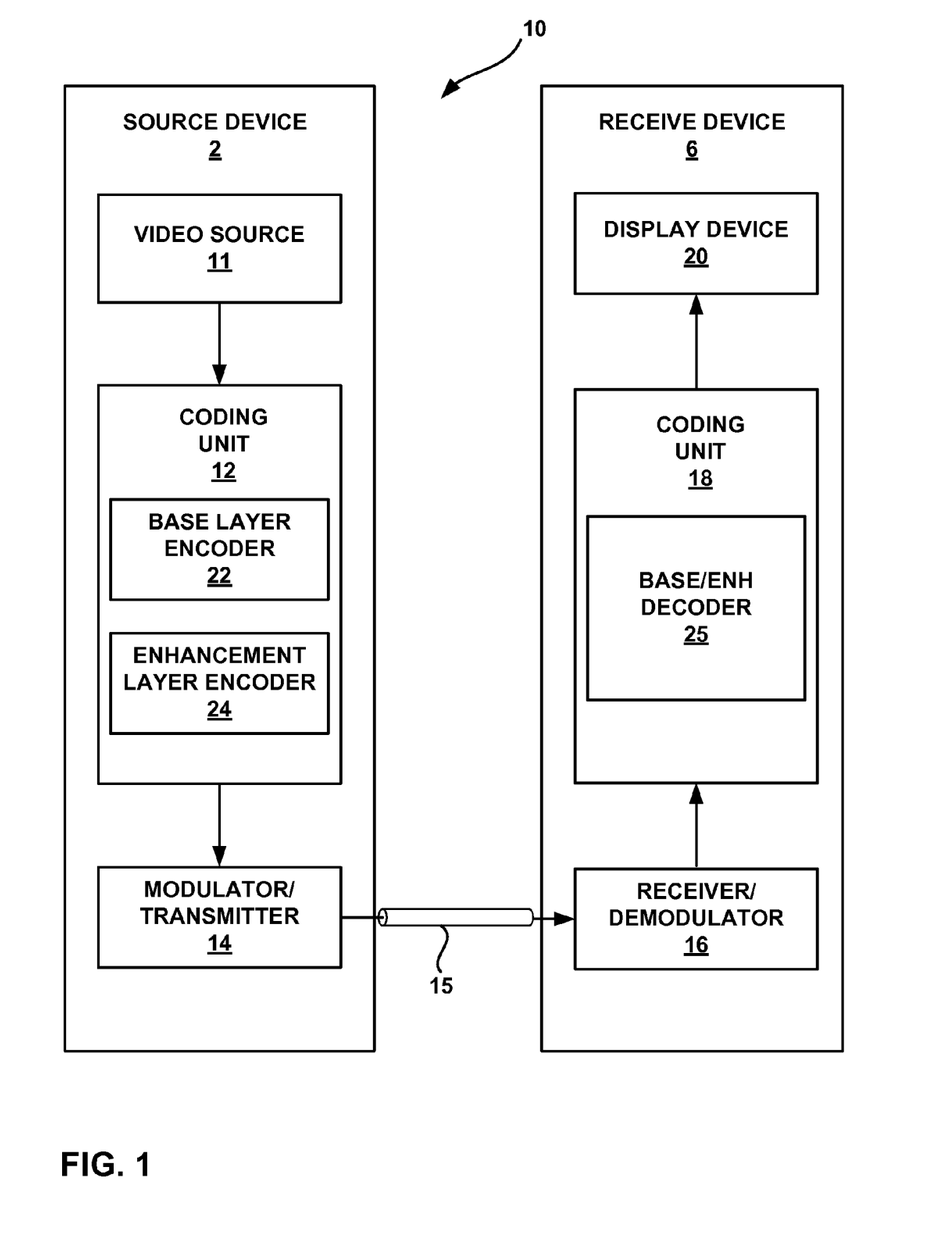
FIG. 1 is an exemplary block diagram illustrating a video encoding and decoding system that may implement the techniques of this disclosure during video encoding, video decoding or both.

FIG. 1 is a block diagram illustrating a video encoding and decoding system 10. As shown in FIG. 1, system 10 includes a source device 2 that transmits encoded video to a receive device 6 via a communication channel 15. Source device 2 may include a video source 11, a coding unit 12 and a modulator/transmitter 14. Receive device 6 may include a receiver/demodulator 16, a coding unit 18, and a display device 20. System 10 may be configured to apply SVC techniques that code at least some partially overlapping video blocks of an enhancement layer using inter-layer prediction relative to a base layer.

Scalable video coding (SVC) refers to video coding in which a base layer and one or more scalable enhancement layers are used. For SVC, a base layer typically carries video data with a base level of quality. One or more enhancement layers carry additional video data to support higher spatial, temporal and/or signal-to-noise SNR levels. Enhancement layers may be defined relative to the previously encoded layer. For spatial scalability, the enhancement layer may add spatial data to the base layer. Some of the video blocks of the enhancement layer may spatially overlap with those of the base layer, some may partially spatially overlap with the video blocks of the base layer, and some may not spatially overlap with the video blocks of the base layer.

In this disclosure, "video blocks" refer to sets of data that represent blocks of an image frame of a video sequence. Video blocks may define pixel values or other types of coefficients that represent the blocks of the image frame. Furthermore, video blocks may assume a wide variety of shapes and sizes. As examples, video blocks may comprise so-called "macroblocks" as defined in H.264/MPEG-4, Part 10, Advanced Video Coding (AVC), or may comprise partitions or sub-partitions of macroblocks.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 2 to receive device 6.

In some aspects, for video broadcasting, the techniques described in this disclosure may be applied to Enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," to be published as Technical Standard TIA-1099 (the "FLO Specification"). That is to say, communication channel 15 may comprise a wireless information channel used to broadcast wireless video information according to the FLO Specification, or the like.

The FLO Specification includes examples defining bitstream syntax and semantics and decoding processes suitable for the FLO Air Interface. Alternatively, video may be broadcasted according to other standards such as DVB-H (digital video broadcast-handheld), ISDB-T (integrated services digital broadcast—terrestrial), or DMB (digital media broadcast). Hence, source device 2 may be a mobile wireless terminal, a wireless video streaming server, or a wireless video broadcast server. However, techniques described in this disclosure are not limited to any particular type of broadcast, multicast, or point-to-point system. In the case of broadcast, source device 2 may broadcast several channels of video data simultaneously to multiple receive devices, each of which may be similar to receive device 6 shown in FIG. 2. Device 6 may comprise a wireless communication device, such as a mobile handset configured for wireless communication, e.g., a cellular radio telephone.

Source device 2 generates coded video data for transmission to receive device 6. In some cases, however, devices 2, 6 may operate in a substantially symmetrical manner. For example, each of devices 2, 6 may include video encoding and decoding components. Hence, system 10 may support one-way or two-way video transmission between video devices 2, 6, e.g., for video streaming, video broadcasting, or video telephony.

Video source 11 of source device 2 may include a video capture device, such as a video camera, a video archive containing previously captured video, or a video feed from a video content provider. For wireless broadcast networks, video source 11 may include equipment to receive and decode satellite or cable television channels, and equipment to preprocess such data. Although not shown in FIG. 1, for broadcasting, a multiplex unit may be used in source device 2 to combine coded video from multiple channels into a multicast. In this case, multiple coding units may code information for different content channels, and the coded information may be combined by a multiplexer unit (not shown) prior to modulation and transmission by modulator/transmitter 14.

As a further alternative, video source 11 may generate computer graphics-based data as the source video, or a combination of live video and computer-generated video. In some cases, if video source 11 is a video camera, source device 2 and receive device 6 may form so-called camera phones or video phones. In each case, the captured, pre-captured or computer-generated video may be encoded by coding unit 12 for transmission from video source device 2 to coding unit 18 of video receive device 6 via modulator/transmitter 14, communication channel 15 and receiver/demodulator 16. The video encoding and decoding processes of coding units 12 and 18 may implement techniques of this disclosure to improve the compression and/or quality of data in an enhancement layer. Display device 20 displays the decoded video data to a user, and may comprise any of a variety of display devices such as a cathode ray tube, a liquid crystal display (LCD), a plasma display, an organic light emitting diode (OLED) display, or another type of display device.

Coding units 12 and 8 may be configured to support SVC for spatial scalability. Coding units 12 and 18 may support various degrees of scalability by supporting encoding, transmission and decoding of a base layer and one or more scalable enhancement layers. Again, for scalable video coding, a base layer carries video data with a baseline level of quality. One or more enhancement layers carry additional data to support higher spatial, temporal and/or SNR levels. The base layer may be transmitted in a manner that is more reliable than the transmission of enhancement layers. For example, more reliable portions of a modulated signal may be used to transmit the base layer, while less reliable portions of the modulated signal may be used to transmit the enhancement layers.

In order to support SVC for spatial scalability, coding unit 12 may include a base layer encoder 22 and one or more enhancement layer encoders 24 to perform encoding of a base layer and one or more enhancement layers, respectively. The techniques of this disclosure, which include inter-layer prediction for partially overlapping video blocks, are applicable to the coding of video blocks of enhancement layers in SVC. According to this disclosure, video blocks of the enhancement layer may be coded differently depending on whether they have full overlap, partial overlap or no overlap with the video blocks of the base layer.

In receive device 6, coding unit 18 may include a combined base/enhancement decoder 25 that decodes the video blocks associated with both base and enhancement layers. Base/enhancement decoder 25 of coding unit 18 may decode the video blocks associated with both base and enhancement layers, and combine the decoded video to reconstruct the frames of a video sequence. Display device 20 receives the decoded video sequence, and presents the video sequence to a user.

Coding unit 12 and coding unit 18 may operate according to a video compression standard, such as MPEG-2, MPEG-4, ITU-T H.263, or ITU-T H.264/MPEG-4, Part 10, Advanced Video Coding (AVC). Although not shown in FIG. 2, in some aspects, coding unit 12 and coding unit 18 may each be integrated with an audio encoder and decoder respectively, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification.

The JVT continues to work on an SVC extension to H.264/MPEG-4 AVC. The specification of the evolving SVC extension is in the form of a Joint Draft (JD). The Joint Scalable Video Model (JSVM) created by the JVT implements tools for use in scalable video, which may be used within system 10 for various coding tasks described in this disclosure.

Coding unit 12 and coding unit 18 each may be implemented as one or more microprocessors, digital signal processors (DSPs), application specific integrated circuits (ASICs), field programmable gate arrays (FPGAs), discrete logic, software, hardware, firmware or any combinations thereof. Each of coding unit 12 and coding unit 18 may be included in one or more encoders or decoders, either of which may be integrated as part of a combined encoder/decoder (CODEC) in a respective mobile device, subscriber device, broadcast device, server, or the like. In addition, source device 2 and receive device 6 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are summarized as being modulator/transmitter 14 of source device 2 and receiver/demodulator 16 of receive device 6 in FIG. 2.

A video sequence includes a series of video frames. Coding unit 12 operates on blocks of pixels (or blocks of coefficients) within individual video frames in order to encode the video data. The video blocks may have fixed or varying sizes, and may differ in size according to a specified coding standard. In some cases, each video frame is a coded unit, while, in other cases, each video frame may be divided into a series of slices that form coded units. Each slice may include a series of macroblocks, which may be arranged into sub-blocks (partitions and sub-partitions). As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components.

Smaller video blocks can provide better resolution, and may be used for locations of a video frame that include higher levels of detail. In general, macroblocks (MBs) and the various sub-blocks may be considered to be video blocks. In addition, a slice may be considered to be a series of video blocks, such as MBs and/or sub-blocks. As noted, each slice may be an independently decodable unit of a video frame.

Base layer encoder 22 may execute standard intra- or inter-based predictive coding to code the video blocks of a base layer. Intra-based predictive coding refers to coding that uses spatial prediction. In this case, the video blocks of a frame being coded are compared to other video blocks of that frame. Residual information is generated by subtracting the current video block to be coded from a predictive video block identified in the intra-based predictive coding process.

Inter-based predictive coding refers to coding that uses temporal prediction. In particular, inter-based predictive coding may use processes referred to as motion estimation and motion compensation. In this case, base layer encoder 22 performs motion estimation to generate motion vectors, which indicate the displacement of video blocks being coded relative to corresponding prediction video blocks in one or more reference frames. Base layer encoder 22 then performs motion compensation, which uses the motion vectors to identify prediction video blocks from a reference frame. After motion compensation, base layer encoder 22 forms a residual video block by subtracting the prediction video block from the video block to be coded. For both intra- and inter-based coding, base layer encoder 22 may apply transform, quantization and entropy coding processes to further reduce the bit rate associated with communication of the residual block.

Enhancement layer encoder 24 may perform coding of the video blocks of an enhancement layer in order to provide spatial scalability. Enhancement layer encoder 24 may support intra- or inter-based coding of various video blocks. In addition, enhancement layer encoder 24 may support inter-layer prediction coding for some of the video blocks of the enhancement layer. In some cases, inter-layer prediction coding is essentially similar to inter-based temporal coding and intra-based spatial coding. In inter-layer prediction coding, however, the predictive blocks used to code the enhancement layer video blocks are located in the corresponding base layer for a given frame. Thus, enhancement layer encoder 24 may compare video blocks of an enhancement layer to video blocks of the corresponding base layer to identify the predictive video block in the base layer. An inter-layer vector may be used to identify the predictive video block. Residual information is generated by subtracting the video block to be coded from a predictive video block identified in the base layer during the inter-layer predictive coding process.

Alternatively, interlayer prediction could entail identifying a predictive video block of the base layer and coding the corresponding video block of the base layer by assigning the texture and motion data from the predictive video block to the video block being coded. In this alternative scenario, the enhancement layer video block assumes or inherits the values of the overlapping predictive video block of the base layer without generating any residual differences.

On the decoding side, base/enhancement decoder 25 of coding unit 18 performs reciprocal decoding functions for base layer video block and enhancement layer video blocks. Thus, coding unit 18 may support intra-based spatial predictive decoding, inter-based temporal predictive coding, and inter-layer based predictive coding. As discussed in greater detail below, enhancement layer encoder 24 of coding unit 12 and base/enhancement decoder 25 of coding unit 18 may also support supplemental coding techniques, such as padding, mirroring or interpolation to address non-overlapping portions of partially overlapping video blocks of the enhancement layer. In this case, the overlapping portions of the partially overlapping video blocks may be coded using inter-layer predictive coding and the non-overlapping portions may be coded using the supplemental coding techniques. The following description generally focuses on coding performed during the encoding process, e.g., by an encoder. It is understood, however that similar reciprocal decoding processes would be performed by a decoder. In this disclosure, the term coding refers generally to encoding, decoding or processes that perform both encoding and decoding.

Figure 2:
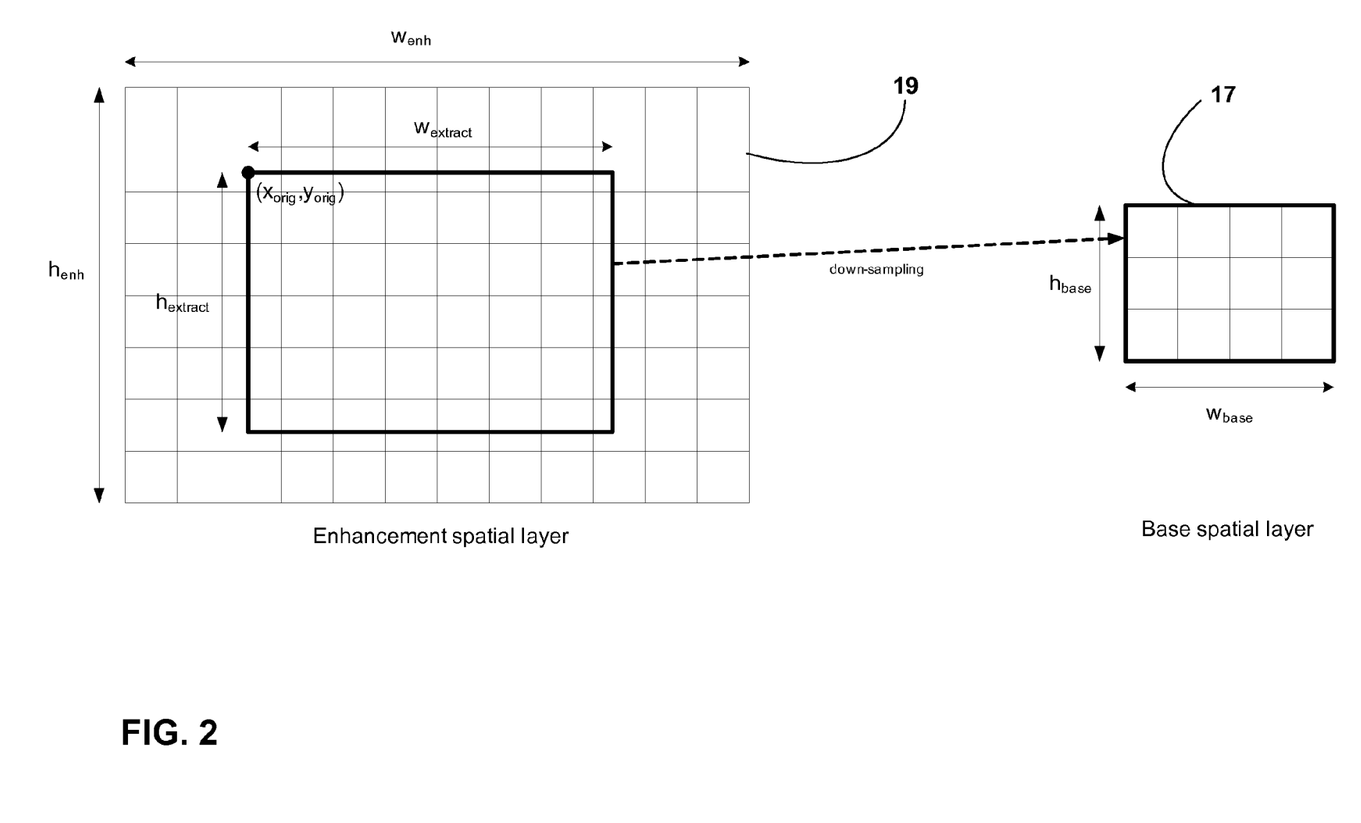
FIG. 2 is a conceptual diagram illustrating an exemplary relationship between a base layer and an enhancement layer of a scalable video coding (SVC) scheme that supports spatial scalability.

FIG. 2 is a conceptual diagram illustrating an exemplary relationship between a base layer 17 and an enhancement layer 19 of a scalable video coding (SVC) scheme that supports spatial scalability. Spatial scalability (sometimes called extended spatial scalability or "ESS"), enables a generalized relationship between successive spatial layers. A picture of a lower spatial layer may represent a cropped area of the higher resolution picture, and the relation between successive spatial layers does not need to be dyadic. Geometrical parameters defining a cropping window and a down-sampling ratio can either be defined at the sequence level, or evolve at the picture level.

ESS may include two tools. The first tool may comprise a cropping tool. The second may comprise a generic up-sampling tool that may apply any horizontal and vertical inter-layer size ratios. The following combinations shown in TABLE 1 can be considered, and the different combinations may correspond to different values of the syntax element extended_spatial_scalability).

TABLE 1

| extended_spatial_scalability | allowed up-sampling ratios | cropping window |
| --- | --- | --- |
| 0 | ratio 1 ratio 2 | no crop |
| 1 | ratio 1 ratio 2 | crop with macroblock alignment sequence level |
| 2 | generic generic | crop with non-macroblock alignment picture level |

Referring again to FIG. 2, consider two successive spatial layers, a low layer (base layer 19) and a high layer (enhancement layer 17), linked by various geometrical relationships. Width and height of enhancement layer pictures can be defined respectively as $w_{enh}$ and $h_{enh}$. Base layer picture dimensions can be defined as $w_{base}$ and $h_{base}$. Base layer pictures may comprise sub-sampled versions of pictures of dimensions $w_{extract}$ and $h_{extract}$. Base layer pictures may be partially or totally inside the enhancement layer pictures, and may be positioned at coordinates ($x_{orig}$, $y_{orig}$) in the enhancement layer picture coordinates system.

In FIG. 2, the enhancement and base layer pictures are divided into macroblocks. The values $w_{extract}/w_{base}$ and $h_{extract}/h_{base}$ correspond to the upsampling factors between base layer pictures and extraction pictures in enhancement layer. The parameters ($x_{orig}$, $y_{orig}$, $w_{extract}$, $h_{extract}$) may completely define the geometrical relationships between high and low layer pictures. In a standard dyadic scalable configuration (e.g., where extended_spatial_scalability=0), the parameters ($x_{orig}$, $y_{orig}$, $w_{extract}$, $h_{extract}$) may be equal to (0, 0, 2*$w_{base}$, 2*$h_{base}$) respectively. This framework may be used to determine whether respective video blocks of the enhancement layer are fully overlapping, partially overlapping or not overlapping with video blocks of the base layer. As described in greater detail below, these different scenarios may lead to different types of coding techniques consistent with this disclosure.

Figure 3:
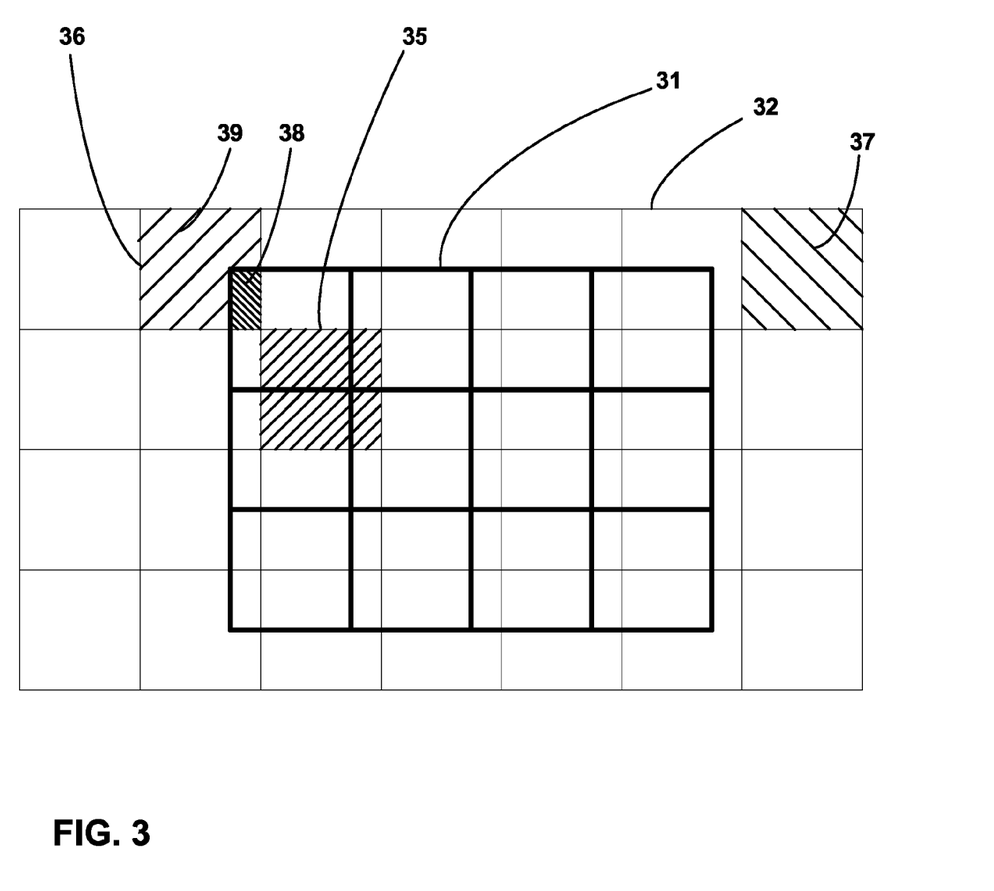
FIG. 3 is a conceptual diagram illustrating video blocks of a base layer and different video blocks of an enhancement layer that fully overlap, partially overlap or do not overlap with the video blocks of the base layer.

FIG. 3 is a conceptual diagram illustrating video blocks of a base layer 31 and different video blocks of an enhancement layer 32 that fully overlap, partially overlap or do not overlap with the video blocks of the base layer. Specifically, video block 35 of enhancement layer 32 fully overlaps the video blocks of base layer 31. Video block 36 of enhancement layer 32 partially overlaps the video blocks of base layer 31, and defines an overlapping portion 38 and a non-overlapping portion 39. Video block 37 of enhancement layer 32 does not overlap the video blocks of base layer 31.

According to this disclosure, some video blocks of enhancement layer 32 may be coded using intra-layer prediction, while other video blocks of enhancement layer 32 may be coded using spatial or temporal prediction. Specifically, non-overlapping video blocks (such as video block 37) are coded using spatial or temporal prediction and overlapping video blocks (such as video block 35) are coded using inter-layer prediction. Some or all of the partially overlapping video blocks (such as video block 36) may be coded using inter-layer prediction. However, for any partially overlapping video blocks that are coded using the inter-layer prediction, the interlayer prediction may be used to code the overlapping portions (such as portion 38). The non-overlapping portions (such as portion 39) of the partially overlapping blocks may be coded using a supplemental coding technique such as padding, mirroring or interpolation.

Partially overlapping block 36 is actually a relatively poor candidate for intra-layer prediction. This is due to the fact that non-overlapping portion 39 is much larger than overlapping portion 38. In some aspects of this disclosure, the partially overlapping video blocks may be analyzed to determine a level of overlap for each of the partially overlapping video blocks. A subset of the partially overlapping video blocks may then be defined as being good candidates for inter-layer prediction based on the determined level of overlap for each of the partially overlapping video blocks. A threshold, for example, may be defined to distinguish good candidates for inter-layer prediction from bad candidates for inter-layer prediction from the set of partially overlapping video blocks. As an example, video blocks that have greater than fifty percent overlap (i.e., a majority of overlap) may be defined as good candidates for inter-layer prediction. Then the inter-coding may be applied to good candidates, while bad candidates are coded using other techniques such as spatial or temporal predictive coding techniques.

Figure 4A:
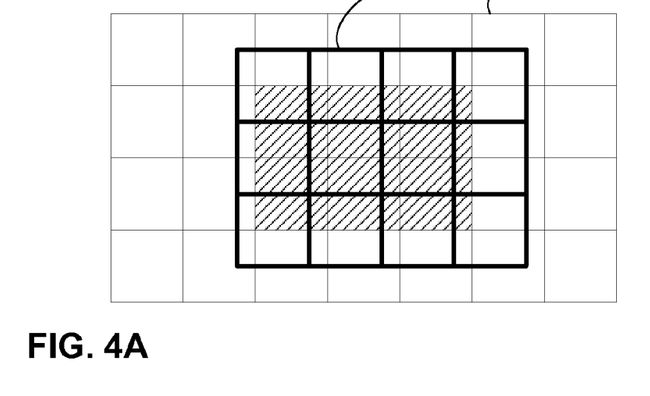
FIG. 4A is a conceptual diagram illustrating video blocks of a base layer and an enhancement layer with shading to identify the fully overlapping video blocks of the enhancement layer.
Figure 4B:
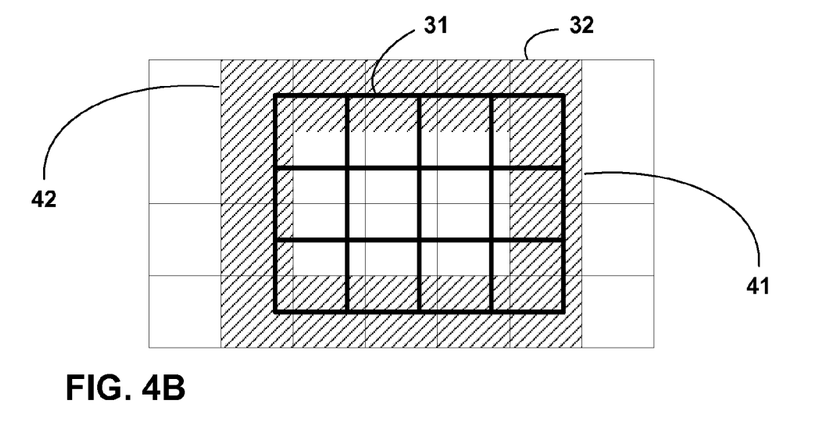
FIG. 4B is a conceptual diagram illustrating video blocks of a base layer and an enhancement layer with shading to identify the partially overlapping video blocks of the enhancement layer.
Figure 4C:
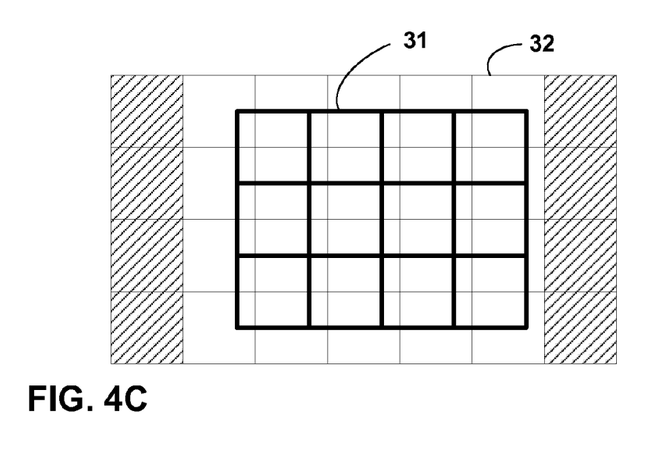
FIG. 4C is a conceptual diagram illustrating video blocks of a base layer and an enhancement layer with shading to identify the video blocks of the enhancement layer that do not overlap those of the base layer.

FIG. 4A is a conceptual diagram illustrating video blocks of a base layer 31 and an enhancement layer 32 with shading to identify the fully overlapping video blocks of the enhancement layer. FIG. 4B is a conceptual diagram illustrating video blocks of a base layer 31 and an enhancement layer 32 with shading to identify the partially overlapping video blocks of the enhancement layer. FIG. 4C is a conceptual diagram illustrating video blocks of a base layer 31 and an enhancement layer 32 with shading to identify the video blocks of the enhancement layer that do not overlap those of the base layer.

Referring now to FIG. 1 and FIGS. 4A-4C, base layer encoder 22 of coding unit 12 codes first video blocks defined in a base layer 31 of an SVC scheme. Enhancement layer encoder 24 of coding unit 12 codes second video blocks defined in an enhancement layer 32 of the SVC scheme, wherein the second video blocks provide spatial scalability enhancement relative to the first video blocks. Specifically, enhancement layer encoder 24 of coding unit 12 may perform inter-layer prediction for enhancement layer 32 relative to base layer 31 for a first subset of the second video blocks that fully overlap the first video blocks (e.g., those shaded in FIG. 4A). In addition, enhancement layer encoder 24 of coding unit 12 may perform inter-layer prediction for enhancement layer 32 relative to base layer 31 for a second subset of the second video blocks that partially overlap the first video blocks (e.g., some or all of those shaded in FIG. 4B). In some cases, enhancement layer encoder 24 of coding unit 12 may perform spatial or temporal prediction for a third subset of the second video blocks that do not overlap with the first video blocks (such as those shaded in FIG. 4C), wherein the spatial or temporal prediction does not include inter-layer prediction.

For the second subset of the second video blocks that partially overlap the first video blocks (e.g., some or all of those shaded in FIG. 4B), enhancement layer encoder 24 may perform inter-layer prediction to code an overlapping portion of second subset of the second video blocks, and may perform supplemental coding techniques to code a non-overlapping portion of the second subset of the second video blocks. These supplemental techniques may include, but are not necessarily limited to padding mirroring or interpolation.

If padding techniques are applied to non-overlapping portions of partially overlapping video blocks, enhancement layer encoder 24 may insert padding pixels derived from the overlapping portion of the base layer for pixels of the non-overlapping portions. If mirroring techniques are applied to non-overlapping portions of partially overlapping video blocks, enhancement layer encoder 24 may create pixel values for the non-overlapping portions that mirror the adjacent inter-layer coded portions of that video block (or possibly create pixel values based on the base layer pixels in the overlapping portions). If interpolation techniques are applied to non-overlapping portions of partially overlapping video blocks, enhancement layer encoder 24 may interpolate values for the non-overlapping portions from adjacent inter-layer coded portions of that video block (or possibly interpolate based on the base layer pixels in the overlapping portions).

In these ways, the ability to use inter-layer coding for the overlapping portions can be preserved by dealing with the non-overlapping portions via supplemental coding techniques. Although the supplemental coding techniques may provide less quality, the quality enhancement and bit savings associated with inter-layer coding of the overlapping portions may result in overall quality and/or compression improvements.

Again, in some cases, inter-layer coding for partially overlapping video blocks is only preformed if the partially overlapping video blocks have sufficient overlap to make the techniques worthwhile. In this case, the second subset of the second video blocks that partially overlap the first video blocks comprises a subset of partially overlapping video blocks of the enhancement layer (e.g., a subset of the shaded video blocks shown in FIG. 4B). Enhancement layer encoder 24 may determine a level of overlap for each of the partially overlapping video blocks (those shaded in FIG. 4B), and define the second subset of the second video blocks based on the determined level of overlap for each of the partially overlapping video blocks. Partially overlapping video block 41 of FIG. 4B may be better suited for inter-layer coding than partially overlapping video block 42 insofar as the overlapping portion of video block 41 is much larger than that of video block 42.

For any of the partially overlapping video blocks that are not coded via inter-layer prediction due to an insufficient level of overlap, enhancement layer encoder 24 may perform spatial or temporal prediction, wherein the spatial or temporal prediction does not include inter-layer prediction. Thus, video block 42 may be coded using spatial or temporal prediction and video block 41 may be coded using interlayer prediction for the overlapping portion and supplemental coding for the non-overlapping portion.

Figure 5:
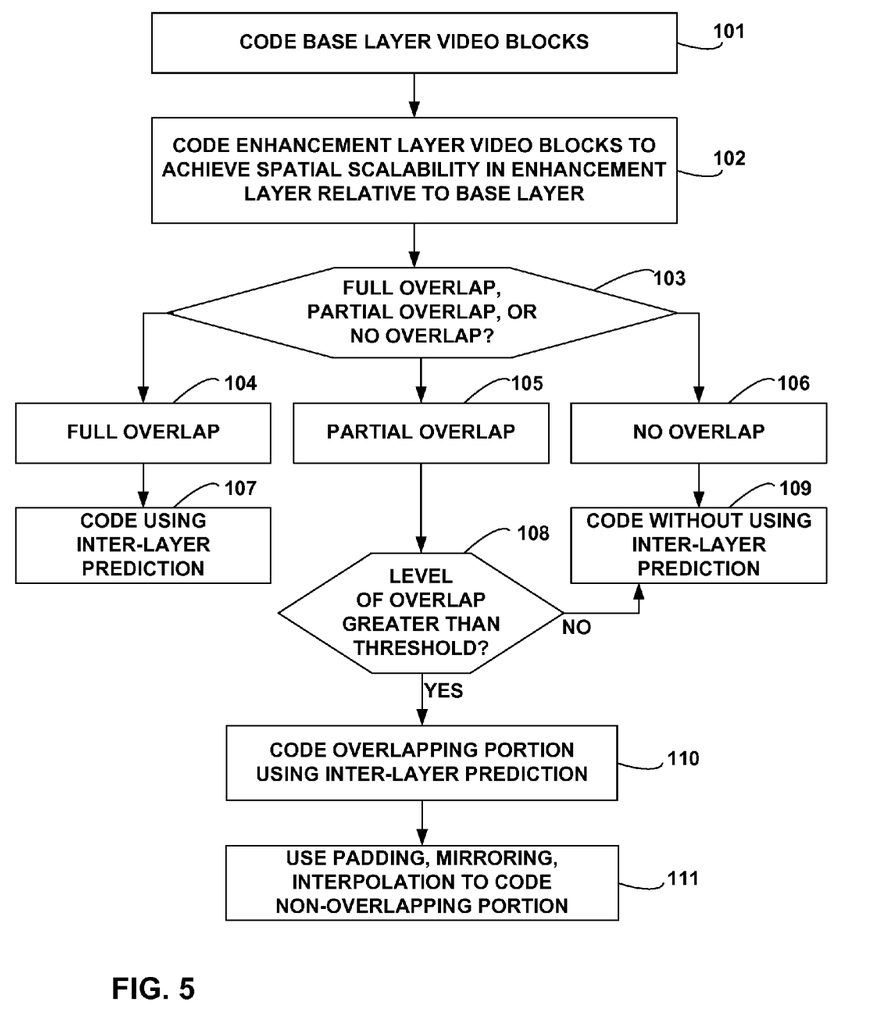
FIG. 5 is a flow diagram illustrating a technique consistent with this disclosure.

FIG. 5 is a flow diagram illustrating a technique consistent with this disclosure. As shown in FIG. 5, based layer encoder 22 of coding unit 12 codes base layer video blocks (101), and enhancement layer encoder 24 codes enhancement layer video blocks to achieve spatial scalability in the enhancement layer relative to the base layer (102). The base layer video blocks may be coded using typical spatial or temporal prediction techniques. In FIG. 5, steps 103-110 (discussed below) may be considered sub-steps of step 102.

In order to code the enhancement layer video blocks, enhancement layer encoder 24 may determine whether each video block has full overlap, partial overlap or no overlap with the base layer video blocks (103). If an enhancement layer video block has full overlap with the base layer video blocks (104), enhancement layer encoder 24 codes the video block using inter-layer prediction (107). If an enhancement layer video block has no overlap with the base layer video blocks (106), enhancement layer encoder 24 codes the video block without using inter-layer prediction (107). In this case, spatial or temporal prediction coding may be used.

If an enhancement layer video block has partial overlap with the base layer video blocks (105), enhancement layer encoder 24 determines whether the level of overlap is greater than some pre-defined threshold (108). If the level of overlap is not greater than the threshold (no branch of 108), enhancement layer encoder 24 codes the video block without using inter-layer prediction (107). In this case, the enhancement layer video block may be viewed as a bad candidate for inter-layer coding. If the level of overlap is greater than the threshold (yes branch of 108) enhancement layer encoder 24 codes the overlapping portion of the partially overlapping enhancement layer video block using inter-layer prediction (110). In this case, the enhancement layer video block may be viewed as a good candidate for inter-layer coding. Enhancement layer encoder 24 codes the non-overlapping portion using padding, mirroring or interpolation (111).

As another example, a method for SVC according to this disclosure may comprise identifying enhancement layer video blocks that partially spatially overlap with base layer video blocks, and inter-coding at least a portion of some of the identified enhancement layer video blocks relative to the base layer video blocks. In this case, enhancement layer encoder 24 may identify the video blocks of enhancement layer 32 (such as block 36) that partially overlap with video blocks of base layer 31. Enhancement layer encoder 24 may then encode at least a portion (such as the overlapping portion 38 of block 36) of some or all of the identified video blocks of enhancement layer 32.

The techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC).

If implemented in hardware, this disclosure may be directed to a circuit, such as an integrated circuit, chipset application specific integrated circuit (ASIC), field programmable gate array (FPGA), logic, or various combinations thereof configured to perform one or more of the techniques described herein.

Various embodiments of the invention have been described. These and other embodiments are within the scope of the following claims.

The invention claimed is:

1. A method of coding information in a scalable video coding (SVC) scheme comprising:
   coding, by a video coder, first video blocks defined in a base layer of the SVC scheme; and
   coding second video blocks defined in an enhancement layer of the SVC scheme, wherein the second video blocks provide spatial scalability enhancement relative to the first video blocks, and wherein coding the second video blocks comprises:
      performing inter-layer prediction for the enhancement layer relative to the base layer for a first subset of the second video blocks that fully overlap the first video blocks; and
      performing inter-layer prediction to code an overlapping portion of a second subset of the second video blocks, wherein the second subset of the second video blocks partially overlap the first video blocks; and
      performing a supplemental coding technique to code a non-overlapping portion of the second subset of the second video blocks, wherein the supplemental coding technique is different than the inter-layer prediction.

2. The method of claim 1, wherein coding the second video blocks includes performing spatial or temporal prediction for a third subset of the second video blocks that do not overlap with the first video blocks, wherein the spatial or temporal prediction does not include inter layer prediction.

3. The method of claim 1, wherein the supplemental coding technique comprises a padding technique to code the non-overlapping portion of the second subset of the second video blocks.

4. The method of claim 1, wherein the supplemental coding technique comprises a mirroring technique to code the non-overlapping portion of the second subset of the second video blocks.

5. The method of claim 1, wherein the supplemental coding technique comprises an interpolation technique to code the non-overlapping portion of the second subset of the second video blocks.

6. The method of claim 1, wherein the second subset of the second video blocks that partially overlap the first video blocks comprises a subset of partially overlapping video blocks of the enhancement layer, the method further comprising:
   determining a level of overlap for each of the partially overlapping video blocks; and
   defining the second subset of the second video blocks based on the determined level of overlap for each of the partially overlapping video blocks.

7. The method of claim 6, further comprising for any of the partially overlapping video blocks that are not defined to be in the second subset and not coded via inter-layer prediction due to an insufficient level of overlap:
   performing spatial or temporal prediction, wherein the spatial or temporal prediction does not include inter-layer prediction.

8. The method of claim 1, wherein coding comprises either encoding or decoding.

9. An apparatus that codes information according to a scalable video coding (SVC) scheme, the apparatus comprising:
   a coding unit that codes first video blocks defined in a base layer of the SVC scheme, and codes second video blocks defined in an enhancement layer of the SVC scheme, wherein the second video blocks provide spatial scalability enhancement relative to the first video blocks, and wherein with respect to the second video blocks the coding unit:
      performs inter-layer prediction for the enhancement layer relative to the base layer for a first subset of the second video blocks that fully overlap the first video blocks; and
      performs inter-layer prediction to code an overlapping portion of a second subset of the second video blocks, wherein the second subset of the second video blocks partially overlap the first video blocks; and
      performs a supplemental coding technique to code a non-overlapping portion of the second subset of the second video blocks, wherein the supplemental coding technique is different than the inter-layer prediction.

10. The apparatus of claim 9, wherein with respect to the second video blocks, the coding unit performs spatial or temporal prediction for a third subset of the second video blocks that do not overlap with the first video blocks, wherein the spatial or temporal prediction does not include inter layer prediction.

11. The apparatus of claim 9, wherein the supplemental coding technique comprises a padding technique to code the non-overlapping portion of the second subset of the second video blocks.

12. The apparatus of claim 9, wherein the supplemental coding technique comprises a mirroring technique to code the non-overlapping portion of the second subset of the second video blocks.

13. The apparatus of claim 9, wherein the supplemental coding technique comprises an interpolation technique to code the non-overlapping portion of the second subset of the second video blocks.

14. The apparatus of claim 9, wherein the second subset of the second video blocks that partially overlap the first video blocks comprises a subset of partially overlapping video blocks of the enhancement layer, wherein the coding unit:
   determines a level of overlap for each of the partially overlapping video blocks; and
   defines the second subset of the second video blocks based on the determined level of overlap for each of the partially overlapping video blocks.

15. The apparatus of claim 14, wherein for any of the partially overlapping video blocks that are not defined to be in the second subset and not coded via inter-layer prediction due to an insufficient level of overlap, the coding unit performs spatial or temporal prediction, wherein the spatial or temporal prediction does not include inter-layer prediction.

16. The apparatus of claim 9, wherein the coding unit comprises either an encoding unit or a decoding unit.

17. The apparatus of claim 9, wherein the apparatus comprises at least one of:
   a circuit; and
   a wireless communication device.

18. A non-transitory computer-readable storage medium comprising instructions that upon execution in a video coding device cause the device to code information in a scalable video coding (SVC) scheme, wherein the instructions cause the device to:
   code first video blocks defined in a base layer of the SVC scheme; and
   code second video blocks defined in an enhancement layer of the SVC scheme, wherein the second video blocks provide spatial scalability enhancement relative to the first video blocks, and wherein with respect to the second video blocks the instructions cause the device to:
      perform inter-layer prediction for the enhancement layer relative to the base layer for a first subset of the second video blocks that fully overlap the first video blocks; and perform inter-layer prediction to code an overlapping portion of a second subset of the second video blocks, wherein the second subset of the second video blocks partially overlap the first video blocks; and
      perform a supplemental coding technique to code a non-overlapping portion of the second subset of the second video blocks, wherein the supplemental coding technique is different than the inter-layer prediction.

19. The non-transitory computer-readable storage medium of claim 18, wherein with respect to the second video blocks the instructions cause the device to perform spatial or temporal prediction for a third subset of the second video blocks that do not overlap with the first video blocks, wherein the spatial or temporal prediction does not include inter layer prediction.

20. The non-transitory computer-readable storage medium of claim 18, wherein the supplemental coding technique comprises a padding technique to code a non-overlapping portion of the second subset of the second video blocks.

21. The non-transitory computer-readable storage medium of claim 18, wherein the supplemental coding technique comprises a mirroring technique to code a non-overlapping portion of the second subset of the second video blocks.

22. The non-transitory computer-readable storage medium of claim 18, wherein the supplemental coding technique comprises inter-layer prediction to code an overlapping portion of the second subset of the second video blocks; and
   perform an interpolation technique to code a non-overlapping portion of the second subset of the second video blocks.

23. The non-transitory computer-readable storage medium of claim 18, wherein the second subset of the second video blocks that partially overlap the first video blocks comprises a subset of partially overlapping video blocks of the enhancement layer, wherein the instructions cause the device to:
   determine a level of overlap for each of the partially overlapping video blocks; and
   define the second subset of the second video blocks based on the determined level of overlap for each of the partially overlapping video blocks,
   wherein for any of the partially overlapping video blocks that are not defined to be in the second subset and not coded via inter-layer prediction due to an insufficient level of overlap, the instructions cause the device to:
      perform spatial or temporal prediction, wherein the spatial or temporal prediction does not include inter-layer prediction.

24. A device that codes information in a scalable video coding (SVC) scheme, the device comprising:
   means for coding first video blocks defined in a base layer of the SVC scheme; and
   means for coding second video blocks defined in an enhancement layer of the SVC scheme, wherein the second video blocks provide spatial scalability enhancement relative to the first video blocks, and wherein the means for coding the second video blocks comprises:
      means for performing inter-layer prediction for the enhancement layer relative to the base layer for a first subset of the second video blocks that fully overlap the first video blocks; and
      means for performing inter-layer prediction to code an overlapping portion of a second subset of the second video blocks, wherein the second subset of the second video blocks partially overlap the first video blocks; and
      means for performing a supplemental coding technique to code a non-overlapping portion of the second subset of the second video blocks, wherein the supplemental coding technique is different than the inter-layer prediction.

* * * * *